US012258666B2

(12) United States Patent
Machno et al.

(10) Patent No.: US 12,258,666 B2
(45) Date of Patent: Mar. 25, 2025

(54) AQUEOUS COMPOSITION FOR COATING GRAIN-ORIENTED STEEL

(71) Applicant: KANSAI HELIOS AUSTRIA GMBH, Vienna (AT)

(72) Inventors: Marek Machno, Vienna (AT); Johann Schellenberg, Baden (AT); Gerhard Typpelt, Vienna (AT); Karl Rametsteiner, Linz (AT); Christian Breitwieser, Vienna (AT)

(73) Assignee: KANSAI HELIOS AUSTRIA GMBH, Vienna (AT)

( * ) Notice: Subject to any disclaimer, the term of this patent is extended or adjusted under 35 U.S.C. 154(b) by 750 days.

(21) Appl. No.: 17/428,720

(22) PCT Filed: Feb. 4, 2020

(86) PCT No.: PCT/EP2020/052666

§ 371 (c)(1),
(2) Date: Aug. 5, 2021

(87) PCT Pub. No.: WO2020/161094

PCT Pub. Date: Aug. 13, 2020

(65) Prior Publication Data

US 2022/0112605 A1 Apr. 14, 2022

(30) Foreign Application Priority Data

Feb. 6, 2019 (EP) .................................... 19155700

(51) Int. Cl.

| | |
|---|---|
| ***C23C 22/18*** | (2006.01) |
| ***C23C 22/20*** | (2006.01) |
| ***H01F 1/147*** | (2006.01) |

(52) U.S. Cl.

CPC .............. *C23C 22/20* (2013.01); *C23C 22/18* (2013.01); *H01F 1/14783* (2013.01)

(58) Field of Classification Search

CPC ......... C23C 22/20; C23C 22/18; C23C 22/74; H01F 1/14783; H01F 1/18

See application file for complete search history.

(56) References Cited

U.S. PATENT DOCUMENTS

| | | | | |
|---|---|---|---|---|
| 4,120,702 A | 10/1978 | Akerblom | | |
| 2003/0180553 A1 * | 9/2003 | Shigesato | C21D 8/1272 427/127 |
| 2016/0060465 A1 * | 3/2016 | Sundermeier | C23C 22/20 106/14.12 |

FOREIGN PATENT DOCUMENTS

| | | |
|---|---|---|
| WO | WO2014180610 | 11/2014 |

OTHER PUBLICATIONS

International Search Report cited in PCT/3P2020/052666 dated Apr. 9, 2020.

International Preliminary Report on Patentability received for PCT Patent Application No. PCT/EP2020/052666, mailed on Aug. 19, 2021, 16 pages (8 pages of English Translation and 8 pages of Original Document).

* cited by examiner

*Primary Examiner* — Humera N. Sheikh
*Assistant Examiner* — Kevin C T Li
(74) *Attorney, Agent, or Firm* — Workman Nydegger

(57) ABSTRACT

The present patent application relates to an aqueous composition for coating grain oriented steel, comprising aluminium cations, manganese cations, dihydrogen phosphate, hydrogen phosphate and/or phosphate anions, colloidal silica and optionally iron cations, wherein the aluminium cations, expressed as $Al_2O_3$, manganese cations, expressed as MnO, dihydrogen phosphate, hydrogen phosphate and/or phosphate anions, expressed as $P_2O_5$, colloidal silica, expressed as $SiO_2$, and optionally iron cations, expressed as FeO, which are present in the composition, give the sum formula of $(Al_2O_3)_2(MnO)_{1,8\text{-}2,4}(FeO)_{0\text{-}0,2}(P_2O_5)_{5\text{-}7}(SiO_2)_{\geq 30}$.

20 Claims, No Drawings

AQUEOUS COMPOSITION FOR COATING GRAIN-ORIENTED STEEL

TECHNICAL FIELD

The present invention relates to aqueous compositions, which are suitable for coating grain oriented steel ("GO" steel), which is, for example, used in transformers.

BACKGROUND OF THE INVENTION

In prior art there have been described numerous methods for producing grain oriented electric steel sheets (see, i.e. U.S. Pat. Nos. 5,288,736, 3,159,511, 5,643,370, JP 2002-2112639, JP 56-158816, DE 1226129, DE 1252220, DE 197 45 445, DE 602 191 58, EP 0 484 904, EP 1 752 548, EP 2 022 874, EP 2 264 220). Grain oriented electric steel sheet is used for transformers, dynamos and high-performance generators in order to ensure the required soft-magnetic properties.

Grain oriented steel is essentially a low-carbon steel (carbon content of approx. 0.01% to approx. 0.1%), which has a high silicon content of approx. 2.5% to approx. 7.0%. The grain orientation is achieved through selected rolling, annealing and tempering steps. Sheets of this steel are ultimately dipole-oriented in the rolling direction and may be magnetised. Such steel sheets are frequently produced as steel bands having a thickness of approx. 0.2 to approx. 0.4 mm. In order to protect these against corrosion until processing (transport, punching a.s.o.), the sheet is usually provided already in the factory, i.e. immediately after the production thereof, with an approx. 1 to 2 μm layer of Mg-silicate ("forsterite"). This is realized by coating with MgO, which will react in an annealing process ("batch annealing") with surface silicon from the steel into silicate. This coating is in the following designated as "base coating".

Methods for application of the "base coating" are as examples described in the DE 198 16 200, DE 602 191 58 and DE 27 43 859, comprising essentially the following steps:

Applying an approx. 10% aqueous MgO dispersion,

Drying off at 100° C.,

Annealing in a hydrogen gas atmosphere at 1000-1350° C.,

Cooling and

Brush-cleaning of excessive MgO.

The base coating offers a temporary sufficient protection against corrosion and is essentially electrically insulating.

Due to the type of coating, this may result in the base coating in irregularities, in particular finest pores, which lead, initially unnoticed, to corrosion in a delayed way.

In U.S. Pat. No. 4,120,702 there is disclosed a method for coating steel sheet having a silicate protective layer, by coating the surface thereof initially with an aqueous solution containing phosphate ions, silica grains, iron and/or manganese ions and negative ions. In the course of the coating method, the steel sheet is then heated to a temperature of between 400° and 1100° C. for periods of approx. 4 minutes to 10 minutes, thereby forming a protective phosphate layer.

It is a task of the present invention to provide methods and means, which allow to improve the corrosion resistance of grain oriented steel and to electrically insulate the surface thereof. These means, in addition, are to comprise no environmentally harmful metals such as chromium, which are currently present in many coating means for grain oriented steel.

In order to ensure user friendliness, it is a further task of the present invention to provide compositions for coating grain oriented steel, which may be directly used without mixing several components and which may be stored, in addition, for a longer period of time without quality limitations.

SUMMARY OF THE INVENTION

The present invention relates to an aqueous composition for coating grain oriented steel, comprising aluminium cations, manganese cations, dihydrogen phosphate, hydrogen phosphate and/or phosphate anions, colloidal silica and optionally iron cations, wherein the aluminium cations, expressed as $Al_2O_3$, manganese cations, expressed as MnO, dihydrogen phosphate, hydrogen phosphate and/or phosphate anions, expressed as $P_2O_5$, colloidal silica, expressed as $SiO_2$, and optionally iron cations, expressed as FeO, which are present in the composition, give the sum formula of $(Al_2O_3)_2(MnO)_{1.8\text{-}2.4}(FeO)_{0\text{-}0.2}(P_2O_5)_{5\text{-}7}(SiO_2)_{\geq 30}$.

It has surprisingly been shown that the initially discussed tasks may be solved with an aqueous solution according to the present invention. The inventive storage-stable composition allows to protect grain oriented steel in a corrosion resistant way and to electrically insulate it, without the composition comprising any environmentally harmful metals such as chromium. Thereby, the inventive composition may be directly applied onto the steel or onto steel base coated with forsterite.

A further aspect of the present invention relates to a method for the production of an aqueous composition for coating grain oriented steel, comprising the step of mixing of compounds releasing aluminium cations, compounds releasing manganese cations, compounds releasing dihydrogen phosphate, hydrogen phosphate and/or phosphate anions, colloidal silica and optionally compounds releasing iron cations, as defined in the present patent application (see claim 1).

In order to produce the inventive composition, the individual compounds are dissolved in water as described above. Methods for mixing such compounds with water have been sufficiently described in prior art. By mixing these components, it is possible to produce storage-stable compositions.

Another aspect of the present invention relates to a method or coating grain oriented steel, comprising the application of an aqueous composition according to the present invention or an aqueous composition that may be produced following a method according to the present invention.

A further aspect of the present invention relates to grain oriented steel, preferably grain oriented steel sheet, obtainable through a coating method according to the present invention.

Another further aspect of the present invention relates to grain oriented steel, preferably grain oriented steel sheet, comprising a coating obtainable by applying an aqueous composition according to the present invention or an aqueous composition that may be produced following a method according to the present invention.

DESCRIPTION OF THE EMBODIMENTS

The aqueous composition according to the invention comprises, apart from water, aluminium cations, manganese cations, dihydrogen phosphate, hydrogen phosphate and/or phosphate anions, colloidal silica and optionally iron cations in a particular molar ratio to one another. This ratio is expressed in the chemical formula $(Al_2O_3)_2(MnO)_{1.8-2.4}(FeO)_{0-0.2}(P_2O_5)_{5-7}(SiO_2)_{\geq 30}$, wherein the aluminium cations contained in the composition are expressed as $Al_2O_3$, manganese cations are expressed as MnO, dihydrogen phosphate, hydrogen phosphate and/or phosphate anions are expressed as $P_2O_5$, colloidal silica is expressed as $SiO_2$ and optionally iron cations are expressed as FeO. The metal cations are preferably added as metal hydroxides, metal oxides or metal salts to the aqueous composition. Dihydrogen phosphate, hydrogen phosphate and/or phosphate anions may either be admixed to the composition as phosphoric acid or as phosphates.

According to a preferred embodiment of the present invention, the above mentioned components are added to the inventive aqueous composition in an amount such that the chemical formula $(Al_2O_3)_2(MnO)_{1.8-2.4}(FeO)_{0-0.2}(P_2O_5)_{5-7}(SiO_2)_{30-100}$, preferably $(Al_2O_3)_2(MnO)_{1.8-2.4}(FeO)_{0-0.2}(P_2O_5)_{5-7}(SiO_2)_{30-80}$, more preferably $(Al_2O_3)_2(MnO)_{1.8-2.4}(FeO)_{0-0.2}(P_2O_5)_{5-7}(SiO_2)_{30-70}$, is given.

The aqueous composition according to the invention may comprise, apart from or instead of iron cations, also other metal cations (apart from aluminium and manganese cations). The molar ratio of these metal cations, expressed as oxide, to the other components in the composition corresponds in the sum that of the iron cations (for this see claim 1).

This aqueous composition may be used for coating grain oriented steel, in particular grain oriented steel sheet. Grain oriented steel sheet, following its production, is prone to corrosion such that it is coated with a base coating (in general, an aqueous MgO dispersion). As this base coating may usually protect only insufficiently the steel sheet against corrosion due to micro-pores and macro-pores in the coating, it is necessary to provide the base-coated steel sheet with a further coating. This (additional) coating may be obtained by means of the aqueous composition according to the invention.

Pores in the base coating may, for example, be detected by applying a diluted permanganate solution. Depending on the extent of porosity, such a solution will be discoloured in dependence of time and concentration, triggered by the access of Mn VIII ions to the selectively exposed steel surface and the oxidation products thereof (concomitant with the reduction of Mn VII to Mn II/III). If there is determined such a porosity in such a test, also this defect may be remedied by means of the coating or composition, respectively, according to the invention. Thereby, the pores are closed in the first coating and there is simultaneously established a sustainable protection against corrosion, which also stands out due to an excellent electrical insulation.

The aqueous composition of the present invention forms a highly effective protection against corrosion, based on a dense layer of silicates and phosphates. This coating further has the following characteristics: hydrolysis resistance, annealing resistance up to 1000° C., electrical insulation, good adherence on the base coating (forsterite layer) or directly on a steel surface, respectively, no stickiness under processing conditions, attenuation of the sound waves caused by magneto-restriction oscillation in a later application operation (in transformers, "transformer noise"). The coating means described in prior art, which are mostly mixed immediately before their use and are not available as a ready-to-use composition, stand out due to comparable characteristics, even if these, in comparison to the coating according to the invention, give rise to a significantly worse quality in regard to the characteristics mentioned above. As an example there is to be mentioned in this regard the DE 2247269, wherein such coating means are disclosed. It is a particular feature of the compositions described therein that these comprise chromium in order to ensure the desired corrosion protection characteristics of the silicate/phosphate matrix used. Cr VI compounds, however, are increasingly, also legally, undesired due to their harmful effect on human health and environment.

It is, hence, necessary to provide chromium-free compositions, without negatively affecting the favourable properties mentioned. Obvious variants to replace chromium by tin, vanadium, titanates, zirconium complexes, however, were unsuccessful as such compounds are either too toxic, entail insufficient stability of the composition or are not available in greater amounts at low costs. In particular the faulty stability of such compositions is especially disadvantageous as the individual components thus have to be stored separately and can only be mixed immediately before their use.

The inventive aqueous compositions are characterized in that these are free from chromium, storage-stable (at least three months at a room temperature of 22° C.), are composed of one component only and that the coatings producible therewith have the necessary physical properties mentioned above.

It has been shown that when reducing the ratio of $Al_2O_3$:MnO to below 1:0.9, then the stability of the composition will decrease markedly and become more or lost at 1:0.75. In contrast, a ratio of above 1:1.2 will increasingly lead to stability problems (turbidity, excretion) in the liquid preparation and would consequently lead to inclusions, turbidity, undesired colour effects and pores in the cured final condition of the coating. According to an especially preferred embodiment of the present invention the ratio $Al_2O_3$:MnO is 1:1 to 1:1.2, more preferably 1:1.1 to 1:1.2.

The ratio $SiO_2$:$P_2O_5$ should preferably be more than 4.3. According to a preferred embodiment of the present invention this ratio, however, is more than 4.3 and less than 16.7, more preferably more than 4.3 and less than 13.3. If the ratio $SiO_2$:$P_2O_5$ is less than 4.3, then this could lead to problems with the hydrolysis and/or corrosion resistance of the coating that may be produced with the composition according to the invention.

The ratio $Al_2O_3$:$P_2O_5$ is preferably higher than 1:2.5 in order to ensure sufficient $SiO_2$ colloid resistance. Depending on the concentration of the further cations, in particular manganese, the portion of $P_2O_5$ is to be adjusted stoichiometrically.

In a particular embodiment of the present invention, upon the detection of pores in the base coating (forsterite, see above), a part of the manganese portion may be replaced or supplemented, respectively, in a second coating (that may be produced by means of the inventive composition) by or with iron oxide.

According to prior art, Mn—Fe mixed phosphates are poorly soluble and, hence, contribute in a positive way to the homogeneity of the base coating (pore closure) as well as to the stability of the second coating (hydrolysis resistance). This may surprisingly occur optimally through the use of iron II oxalate, which is known to thermally disintegrate, in a reducing way at more than approx. 600° C. and, hence, refills impurities in the base coating not only with iron oxide or iron phosphate, respectively, but also reduces already anoxidized steel surfaces.

According to a preferred embodiment of the present invention the number of $SiO_2$ in the chemical formula according to claim 1 is 30 to 100, preferably 30 to 80, more preferably 30 to 70.

According to a further preferred embodiment of the present invention the number of $P_2O_5$ in the chemical formula is 5.4 to 6.8, preferably 5.6 to 6.6, more preferably 5.8 to 6.4.

The aluminium cations, manganese cations, dihydrogen phosphate, hydrogen phosphate and/or phosphate anions and optional iron cations present in the composition according to the invention may be introduced thereto by mixing different salts, hydroxides, oxides and/or salts with water. According to a preferred embodiment of the present invention the composition according to the invention comprises, hence, aluminium hydroxide and/or aluminium phosphate.

Manganese cations are added to the aqueous composition according to the invention preferably as manganese (II) oxide, manganese (II) oxalate and/or manganese (II) hydroxide.

According to a preferred embodiment of the present invention iron cations are added to the aqueous composition according to the invention as iron (II) oxide and/or iron (II) oxalate, wherein iron (II) oxalate is especially preferred.

Instead of or additionally to iron cations, the inventive composition may further comprises other or further, respectively, metal cations, which are able to form poorly soluble phosphates or pyrophosphates, respectively. In the composition according to the invention metal cations, expressed as metal oxides, minus aluminium and manganese cations, are present in the same stoichiometric ratio to one another as indicated in the chemical formula according to claim 1 for iron cations, expressed as iron oxide.

It has been shown according to the invention that it is especially advantageous that colloidal silica contained in the aqueous solution is free from charges. This is, colloidal silica comprising charged metal ions or the like is less preferred or not desired, respectively. For this reason, the colloidal silica in the aqueous composition according to the invention is essentially free from surface charges.

According to a preferred embodiment of the present invention the colloidal silica comprises silica particles, preferably spherical silica particles, of the size of 5 and 80 nm, preferably between 5 and 60 nm, more preferably between 5 and 40 nm.

The silica particles in the composition according to the invention have at a size of 5 nm a specific surface area of 400 to 450 $m^2/g$, at a size of 15 nm a specific surface area of 180 to 200 $m^2/g$, at a size of 20 nm a specific surface area of 130 to 150 $m^2/g$, at a size of 25 nm a specific surface area of 100 to 120 $m^2/g$, at a size of 30 nm a specific surface area of 90 to 110 $m^2/g$, at a size of 35 nm a specific surface area of 60 to 70 $m^2/g$, at a size of 40 nm a specific surface area of 40 to 50 $m^2/g$.

As only the hydroxyl groups of the colloidal silica that are resident on the surface and thus freely accessible to reaction and condensation are available for the density of the matrix to be formed, the size of the spheres, the specific surface area thereof as well as the free availability of the hydroxyl groups (not blocked by "stabilization" of, e.g., sodium ions) are of importance for the durability of the liquid preparation as well as for the required quality of the final coating that may be produced with the composition.

According to a preferred embodiment of the present invention the ratio of the sum of the specific surface area of the particles of the colloidal silica to the total molar number of all metal oxides is 1:10000 to 1:200000, preferably 1:20000 to 1:150000, more preferably 1:25000 to 1:100000, even more preferably 1:30000 to 1:80000.

According to a further preferred embodiment of the present invention the molar ratio of the sum of the metal ions, expressed as their oxides, in particular of the sum of the aluminium cations, expressed as $Al_2O_3$, and manganese cations, expressed as MnO, to silica in the composition is 1:6.5 to 1:26.5, preferably 1:6.8 to 1:20, more preferably 1:7.5 to 1:18, more preferably 1:8 to 1:16.

According to an especially preferred embodiment of the present invention the molar ratio of the sum of the metal ions, expressed as their oxides, in particular of the sum of the aluminium cations, expressed as $Al_2O_3$, and manganese cations, expressed as MnO, to silica in the composition is preferably 1:9 to 1:13, more preferably 1:10 to 1:12, if a surface is coated with the aqueous composition having a layer thickness of less than 1.5 μm, preferably less than 1 μm.

According to an especially preferred embodiment of the present invention the molar ratio of the sum of the metal ions, expressed as their oxides, in particular of the sum of the aluminium cations, expressed as $Al_2O_3$, and manganese cations, expressed as MnO, to silica in the composition is preferably 1:10 to 1:14, more preferably 1:11 to 1:13, if a surface is coated with the aqueous composition having a layer thickness of 2 to 10 μm, preferably 2 to 5 μm.

According to another preferred embodiment of the present invention the aqueous composition according to the invention has a solids content of between 10% and 70%, preferably of 20% to 60%, more preferably of 25% to 40%.

A further aspect of the present invention relates to a method for the method for producing an aqueous composition for coating grain oriented steel, comprising the step of mixing compounds releasing aluminium cations, compounds releasing manganese cations, compounds releasing dihydrogen phosphate, hydrogen phosphate and/or phosphate anions, compounds releasing colloidal silica and optionally iron cations as defined above.

Compounds releasing ions are compounds that are able to release ions in water (e.g., metal ions like aluminium). Compounds releasing ions may be salts, oxides, oxalates or hydroxides.

Another further aspect of the present inventions relates to a method for coating grain oriented steel, comprising applying an aqueous composition according to the present invention or an aqueous composition that may be produced according to a method according to the invention.

According to another preferred embodiment of the present invention the grain oriented steel is base-coated with forsterite.

As initially mentioned, the grain oriented steel to be coated may comprise a base coating in order to protect it against rapid corrosion after the production thereof. The base coating comprises preferably forsterite.

According to another preferred embodiment of the present invention the grain oriented steel has the form of a steel sheet. Such steel sheets may, for example, be used for the production of transformers.

According to an especially preferred embodiment of the present invention the aqueous composition is applied onto the grain oriented steel in an amount of 1 to 50 $g/m^2$, preferably of 2 to 40 $g/m^2$, more preferably of 3 to 30 $g/m^2$, more preferably of 4 to 20 $g/m^2$.

The aqueous composition is preferably applied onto the grain oriented steel by means of a dipping method, a rolling method or a spraying method.

According to a preferred embodiment of the present invention the grain oriented steel coated with the aqueous composition is treated at a temperature of 500° C. to 900° C., preferably of 600° C. to 850° C.

According to another preferred embodiment of the present invention the aqueous composition is applied onto the grain oriented steel in a layer thickness of 100 nm to 20 μm, preferably of 200 nm to 10 μm.

A further aspect of the present invention relates to grain oriented steel, preferably grain oriented steel sheet, obtainable through a method according to the present invention.

Another further aspect of the present invention relates to grain oriented steel, preferably grain oriented steel sheet, comprising a coating obtainable by applying an aqueous composition according to the present invention or an aqueous composition that may be produced according to a method according to the present invention.

The present invention relates, inter alia, to the following embodiments.

1. Aqueous composition for coating grain oriented steel, comprising
   aluminium cations,
   manganese cations,
   dihydrogen phosphate, hydrogen phosphate and/or phosphate anions,
   colloidal silica and
   optionally iron cations, wherein the aluminium cations, expressed as $Al_2O_3$, manganese cations, expressed as MnO, dihydrogen phosphate, hydrogen phosphate and/or phosphate anions, expressed as $P_2O_5$, colloidal silica, expressed as $SiO_2$, and optionally iron cations, expressed as FeO, which are present in the composition, give the sum formula of $(Al_2O_3)_2(MnO)_{1.8\text{-}2.4}(FeO)_{0\text{-}0.2}(P_2O_5)_{5\text{-}7}(SiO_2)_{\geq 30}$.
2. Aqueous composition according to embodiment 1, wherein the number of $SiO_2$ in the chemical formula is 30 to 100, preferably 30 to 80, more preferably 30 to 70.
3. Aqueous composition according to embodiment 1 or 2, wherein the number of $P_2O_5$ in the chemical formula is 5.4 to 6.8, preferably 5.6 to 6.6, more preferably 5.8 to 6.4.
4. Aqueous composition according to any of embodiments 1 to 3, wherein this comprises aluminium hydroxide and/or aluminium phosphate.
5. Aqueous composition according to any of embodiments 1 to 4, wherein this comprises manganese (II) oxide, manganese (II) oxalate and/or manganese (II) hydroxide.
6. Aqueous composition according to any of embodiments 1 to 5, wherein this comprises iron oxide, iron (II) oxide and/or iron (II) oxalate.
7. Aqueous composition according to any of embodiments 1 to 6, wherein the colloidal silica is free from surface charges.
8. Aqueous composition according to any of embodiments 1 to 7, wherein the colloidal silica comprises silica particles, preferably spherical silica particles, of a size of between 5 and 80 nm, preferably between 5 and 60 nm, more preferably between 5 and 40 nm.
9. Aqueous composition according to any of embodiments 1 to 8, wherein the specific surface area of the colloidal silica has a ratio to the total molar number of all metal oxides contained in the composition of 1:25000 to 1:100000, preferably of 1:30000 to 1:80000.
10. Aqueous composition according to embodiment 8 or 9, wherein the silica particles in the composition according to the invention have at a size of 5 nn a specific surface area of 400 to 450 $m^2/g$, at a size of 15 nm a specific surface area of 180 to 200 $m^2/g$, at a size of 20 nm a specific surface area of 130 to 150 $m^2/g$, at a size of 25 nm a specific surface area of 100 to 120 $m^2/g$, at a size of 30 nm a specific surface area of 90 to 110 $m^2/g$, at a size of 35 nm a specific surface area of 60 to 70 $m^2/g$, at a size of 40 nm a specific surface area of 40 to 50 $m^2/g$.
11. Aqueous composition according to any of the embodiments 1 to 10, wherein the ratio of the sum of the specific surface area of the particles of the colloidal silica to the total molar number of all metal oxides is 1:10000 to 1:200000, preferably 1:20000 to 1:150000, more preferably 1:25000 to 1:100000, even more preferably 1:30000 to 1:80000.
12. Aqueous composition according to any of the embodiments 1 to 11, wherein the molar ratio of the sum of the metal ions, expressed as their oxides, to silica in the composition is 1:6.5 to 1:26.5, preferably 1:6.8 to 1:20, more preferably 1:7.5 to 1:18, more preferably 1:8 to 1:16.
13. Aqueous composition according to any of the embodiments 1 to 12, wherein the molar ratio of the sum of the metal ions, expressed as their oxides, to silica in the composition is preferably 1:9 to 1:13, more preferably 1:10 to 1:12, if a surface is coated with the aqueous composition having a layer thickness of less than 1.5 μm, preferably less than 1 μm.
14. Aqueous composition according to any of the embodiments 1 to 13, wherein the molar ratio of the sum of the metal ions, expressed as their oxides, to silica in the composition s preferably 1:10 to 1:14, more preferably 1:11 to 1:13, if a surface is coated with the aqueous composition having a layer thickness of 2 to 10 μm, preferably 2 to 5 μm.
15. Aqueous composition according to any of the embodiments 1 to 14, wherein this has a solids content of between 10% and 70%, preferably of 20% to 60%, more preferably of 25% to 40%.
16. Method for producing an aqueous composition for coating grain oriented steel, comprising the step of mixing compounds releasing aluminium cations, compounds releasing manganese cations, compounds releasing dihydrogen phosphate, hydrogen phosphate and/or phosphate anions, compounds releasing colloidal silica and optionally iron cations as defined in one of the embodiments 1 to 15.
17. Method for coating grain oriented steel, comprising applying an aqueous composition according to any of the embodiments 1 to 15 or an aqueous composition that may be produced according to a method according to embodiment 16.
18. Method according to embodiment 17, wherein the grain oriented steel is base-coated with forsterite.
19. Method according to embodiment 17 or 18, wherein the grain oriented steel has the form of a sheet.
20. Method according to any of the embodiments 17 to 19, wherein the aqueous composition is applied onto the grain oriented steel in an amount of 1 to 50 $g/m^2$, preferably of 2 to 40 $g/m^2$, more preferably of 3 to 30 $g/m^2$, more preferably of 4 to 20 $g/m^2$.
21. Method to one the embodiments 17 to 20, wherein the aqueous composition is applied onto the grain oriented steel by means of a dipping method, a rolling method or a spraying method.

22. Method according to any of the embodiments 17 to 20 wherein the grain oriented steel coated with the aqueous composition is treated at a temperature of 500° C. to 900° C., preferably of 600° C. to 850° C.
23. Method according to any of the embodiments 17 to 22, wherein the aqueous composition is applied onto the grain oriented steel at a layer thickness of 100 nm to 20 μm, preferably of 200 nm to 10 μm.
24. Grain oriented steel, preferably grain oriented steel sheet, obtainable through a method according to any of the embodiments 17 to 23.
25. Grain oriented steel, preferably grain oriented steel sheet, comprising a coating obtainable by applying an aqueous composition according to any of the embodiments 1 to 15 or an aqueous composition that may be produced according to a method according to embodiment 16.

EXAMPLES

Example 1: Production of Aqueous Compositions for Coating Grain Oriented Steel In a mixture of 400 g 75% phosphoric acid and 135 ml water, 78 g aluminium tri-hydroxide, in the following 40 g manganese (II) oxide and 7 g iron (II) oxalate were dissolved into a clear, viscous phosphate containing solution. The resulting solution had a total weight of 660 g. To 200 g of the phosphate containing solution, there were added 800 g charge-free silica sol (colloidal silica) having a solids content of 30% ($SiO_2$ spheres having a diameter of 35 nm on average) to a clear homogenous preparation. The calculated composition was $(Al_2O_3)_2(MnO)_{2.2}(FeO)_{0.2}(SiO_2)_{53}(P_2O_5)_{6.3}$ (composition 1).

After application on a base-coated GO steel sheet (i.e. a grain oriented steel sheet coated with forsterite) in an amount of 5 g/m², this was then briefly dried in air, and the layer was cured for 60 seconds at 820° C.

By adjusting the stoichiometric ratios of the components mentioned above, it was possible to produce the following further compositions (compositions 2 to 9):

Composition 2
$(Al_2O_3)_2(MnO)_{2.1}(FeO)_{0.18}(SiO_2)_{75}(P_2O_5)_{6.2}$

Composition 3
$(Al_2O_3)_2(MnO)_{2.2}(FeO)_{0.18}(SiO_2)_{49}(P_2O_5)_{6.3}$

Composition 4
$(Al_2O_3)_2(MnO)_{2.0}(FeO)_{0.2}(SiO_2)_{32}(P_2O_5)_{6.5}$

Composition 5 (without Iron Oxide)
$(Al_2O_3)_2(MnO)_{2.2}(SiO_2)_{55}(P_2O_5)_{6.1}$ Composition 6
$(Al_2O_3)_2(MnO)_{1.75}(FeO)_{0.15}(SiO_2)_{55}(P_2O_5)_{6.2}$ Composition 7 (Iron Oxide Instead of Iron Oxalate in the Phosphate Containing Solution)
$(Al_2O_3)_2(MnO)_{2.2}(FeO)_{0.2}(SiO_2)_{53}(P_2O_5)_7$ Also the compositions 2 to 7 were applied onto a base-coated GO steel sheet in an amount of 5 g/m², were briefly dried in air and then cured for 60 seconds at 820° C.

| Composition no. | $SiO_2$: $P_2O_5$ | $Al_2O_3$: MnO | $Al_2O_3$: $P_2O_5$ | $m^2$ $SiO_2$ per $Me_xO_y$*) | $Me_xO_y$:: $SiO_2$ | Chemical formula |
|---|---|---|---|---|---|---|
| 1 | 8.41 | 1:1.1 | 1:3.15 | 47,000 | 1:12.05 | $(Al_2O_3)_2(MnO)_{2.2}(FeO)_{0.2}(SiO_2)_{53}(P_2O_5)_{6.3}$ |
| 2 | 12.10 | 1:1.05 | 1:3.10 | 68,000 | 1:17.52 | $(Al_2O_3)_2(MnO)_{2.1}(FeO)_{0.18}(SiO_2)_{75}(P_2O_5)_{6.2}$ |
| 3 | 7.78 | 1:1.1 | 1:3.15 | 44,000 | 1:11.19 | $(Al_2O_3)_2(MnO)_{2.2}(FeO)_{0.18}(SiO_2)_{49}(P_2O_5)_{6.3}$ |
| 4 | 4.92 | 1:1 | 1:3.25 | 28,000 | 1:7.62 | $(Al_2O_3)_2(MnO)_{2.0}(FeO)_{0.2}(SiO_2)_{32}(P_2O_5)_{6.5}$ |
| 5 | 9.02 | 1:1.1 | 1:3.05 | 51,000 | 1:13.10 | $(Al_2O_3)_2(MnO)_{2.2}(SiO_2)_{55}(P_2O_5)_{6.1}$ |
| 6 | 8.87 | 1:0.875 | 1:3.10 | 55,000 | 1:14.10 | $(Al_2O_3)_2(MnO)_{1.75}(FeO)_{0.15}(SiO_2)_{55}(P_2O_5)_{6.2}$ |
| 7 | 7.57 | 1:1.1 | 1:3.50 | 47,000 | 1:12.05 | $(Al_2O_3)_2(MnO)_{2.2}(FeO)_{0.2}(SiO_2)_{53}(P_2O_5)_7$ |

*)calculated with $SiO_2$ colloid 35 nm/65 m²/g; higher m² number adjustable with 20 nm/140 m²/g. $Me_xO_y$ designates the sum of all metal ions, expressed as the oxides thereof

Example 2: Comparative Compositions

In order to illustrate the advantages of the composition according to the invention over other compositions from prior art, there were carried out the respective tests using comparative compositions.

Comparative Composition 1 (Example B1 from the WO 2014/180610 (Al, Mn))

$(Al_2O_3)_8(MnO)_2(SiO_2)_{20}(P_2O_5)_{27}$

Comparative Composition 2 (Example 1 from the EP 2 264 220 A1, ($KMnO_4$))

$(Al_2O_3)_5(MnO_2)(K_2O)_{0.5}(SiO_2)_{29}(P_2O_5)_{5.5}$

Comparative Composition 3 (Example 3 from the DE 2247269 (Al, Cr))

$(Al_2O_3)_2(CrO_3)_{2.4}(SiO_2)_{12}(P_2O_5)_6$

Comparative Composition 4 (Example B3 from the WO 2014/180610 (Al, Mn, Zn, Mg))

$(Al_2O_3)_{1.6}(MnO)_{0.6}(ZnO)_{0.2}(MgO)_2(SiO_2)_{16}(P_2O_5)_5$

The comparative compositions 1 to 4 were then, as described in example 1, applied onto a base-coated GO steel sheet in an amount of 5 g/m$^2$, briefly dried in air and then cured for 60 seconds at 820° C.

| Comparative composition no. | $SiO_2$: $P_2O_5$ | $Al_2O_3$: MnO | $Al_2O_3$: $P_2O_5$ | m$^2$ $SiO_2$ per $Me_xO_y$ *) | $Me_xO_y$:. $SiO_2$ | Chemical formula |
|---|---|---|---|---|---|---|
| 1 | 0.74 | 1:0.25 | 1:3.38 | 7,800 | 1:2 | $(Al_2O_3)_8$ $(MnO)_2$ $(SiO_2)_{20}$ $(P_2O_5)_{27}$ |
| 2 | 5.27 | / | 1:1.10 | 17,400 | 1:4.46 | $(Al_2O_3)_5$ $(MnO_2)$ $(K_2O)_{0.5}$ $(SiO_2)_{29}$ $(P_2O_5)_{5.5}$ |
| 3 | 2.0 | / | 1:3.0 | 10,600 | 1:2.73 | $(Al_2O_3)_2$ $(CrO_3)_{2.4}$ $(SiO_2)_{12}$ $(P_2O_5)_6$ |
| 4 | 3.2 | 1:0.37 | 1:3.13 | 14,200 | 1:3.64 | $(Al_2O_3)_{1.6}$ $(MnO)_{0.6}$ $(ZnO)_{0.2}$ $(MgO)_2$ $(SiO_2)_{16}$ $(P_2O_5)_5$ |

*) calculated with $SiO_2$ colloid 35 nm/65 m$^2$/g; higher m$^2$ number adjustable with 20 nm/140 m$^2$/g. $Me_xO_y$ designates the sum of all metal ions, expressed as the oxides thereof

Example 3: Examination of the Compositions and Coatings of the Examples 1 and 2

In order to determine or evaluate, respectively, the quality of the compositions according to the examples 1 and 2 and their suitability for coating grain oriented steel, there were performed several tests.

Stability of the Compositions

It is an aim of the invention to provide storage-stable aqueous compositions in order to ensure sufficient user friendliness. For this reason, the stability of the aqueous composition was assessed. In this regard, there was observed over a longer period of time whether the aqueous composition remains stirrable and whether particles deposit. Both characteristics are important for the storage-stability of the compositions.

Visual Appearance of the Steel Surface (Emergence of Corrosion/Resistance to Hydrolysis)

A decisive quality criterion of compositions, which are used for coating grain oriented steel, is their capability to protect the coated steel against corrosion. For this assertion, a staple of coated steel sheet samples wetted with water, the base coating thereof comprising Mg silicate (forsterite) was coated with the compositions according to the examples 1 and 2, was densely packed into a water- and vapour-proof film and stored in a heating box for 8 h at 90° C. Subsequently, the surface of the coated steel sheets was optically assessed.

Colour of the Cured Coating

Upon application of the compositions onto the GO steel sheet and upon subsequent heating (see above), the colour was then visually assessed.

Coating Inclusions (Solid)

Inclusion in the final coating may also represent a relevant criterion for the quality of the composition according to the invention. Any inclusions were visually determined and assessed.

Formation of Pores and Bubbles

The formation of bubbles in the final coating on the steel sheet is in general undesired, as bubbles are precursors of a later emergence of corrosion. The formation of bubbles may be visually assessed.

Results

The results of the tests above are given in the following table:

| | Stability | Visual appearance of the steel surface | Colour of the coating | Solid inclusions | Pores/ bubbles | Hydrolysis resistance* |
|---|---|---|---|---|---|---|
| Composition no. | | | | | | |
| 1 | >3 Months | Uniform | Light grey, bright | — | — | 1 |
| 2 | >3 Months | Slight corrosion in dots | Light grey bright | Individual bright streaks | Sporadic | 1 |
| 3 | >3 Months | Uniform | Light grey, matt uniform | — | — | 2 |
| 4 | >3 Months | Uniform | Light grey, matt uniform | Bright surface streaks | — | 2 |
| 5 | >3 Months | Slight corrosion in dots | Light grey matt | — | — | 1 |
| 6 | >1 Months | Corrosion in fringe zones | Light grey bright streaks | Non-uniform surface | — | 2 |
| 7 | >3 Months | Uniform | Light grey, matt uniform | — | — | 1-2 |
| Comparative Composition no. 1 | | | | | | |
| 1 | 4 days | Uniform | Dull and hazy | Black dots ($MnO_2$) | Uniformly distributed | 3 |
| 2 | 8 hours | Marked corrosion in dots | Light grey | Dark streaks | Sporadic | 3-4 |
| 3 | Multi-component material (<5 hours) | Uniform | Grey-yellowish | Green streaks | Sporadic | 1 |
| 4 | 1 day | Uniform | light grey | Bright grains | — | 1-2 |

*1 = optimal, 2 = acceptable for common practice, 3 = satisfying, improvable, 4 = not suitable The results show impressively that the compositions according to the invention (compositions 1 to 5 and 7) have a high storage stability of more than 3 months and, hence, the coatings produced therewith have a high resistance to hydrolysis and an extremely low proneness to corrosion. The comparative compositions from prior art have low storage stability in a ready-to-use mixture. Also the hydrolysis stability of the coatings produced therewith is not optimal. The composition 6 shows in addition that a low molar ratio between $Al_2O_3$ and MnO (2:1.75) in the composition will lead to lower storage stability.

The invention claimed is:

1. An aqueous composition for coating grain oriented steel, comprising
   - aluminium cations,
   - manganese cations,
   - dihydrogen phosphate, hydrogen phosphate and/or phosphate anions,
   - colloidal silica, and
   - optionally iron cations,
   - wherein the aluminium cations, expressed as $Al_2O_3$, manganese cations, expressed as MnO, dihydrogen phosphate, hydrogen phosphate and/or phosphate anions, expressed as $P_2O_5$, colloidal silica, expressed as $SiO_2$, and optionally iron cations, expressed as FeO, which are present in the composition, give a chemical formula of $(Al_2O_3)_2(MnO)_{1.8-2.4}(FeO)_{0-0.2}(P_2O_5)_{5-7}(SiO_2)_{\geq 30}$.

2. An aqueous composition according to claim 1, wherein the number of $SiO_2$ in the chemical formula is 30 to 100.

3. An aqueous composition according to claim 1, wherein the number of $P_2O_5$ in the chemical formula is 5.4 to 6.8.

4. An aqueous composition according to claim 1, wherein the aqueous composition comprises aluminium hydroxide and/or aluminium phosphate.

5. An aqueous composition according to claim 1, wherein the aqueous composition comprises manganese (II) oxide, manganese (II) oxalate and/or manganese (II) hydroxide.

6. An aqueous composition according to claim 1, wherein the aqueous composition comprises iron oxide, iron (II) oxide and/or iron (III) oxalate.

7. An aqueous composition according to claim 1, wherein the colloidal silica is free of surface charges.

8. An aqueous composition according to claim 1, wherein the colloidal silica comprises spherical silica particles of a size between 5 and 80 nm.

9. An aqueous composition according to claim 1, wherein the ratio of the sum of the specific surface area of the particles of the colloidal silica to the total molar number of all metal oxides is 1:10000 to 1:200000.

10. An aqueous composition according to claim 1, wherein the molar ratio of the sum of the metal ions, expressed as the oxides thereof, to silica in the composition is 1:6.5 to 1:26.5.

11. An aqueous composition according to claim 1, wherein the molar ratio of the sum of the metal ions, expressed as the oxides thereof, to silica in the composition is 1:9 to 1:13 if a surface is coated with the aqueous composition having a layer thickness of less than 1.5 μm.

12. An aqueous composition according to claim 1, wherein the molar ratio of the sum of the metal ions, expressed as the oxides thereof, to silica in the composition is 1:10 to 1:14 if a surface is coated with the aqueous composition having a layer thickness of 2 to 10 μm.

13. A method for coating grain oriented steel, comprising the application of an aqueous composition according to claim 1.

14. A method according to claim 13, wherein the grain oriented steel is base coated with forsterite.

15. A grain oriented steel obtainable by a method according to claim 13.

16. A grain oriented steel comprising a coating obtainable by the application of an aqueous composition according to claim 1.

17. An aqueous composition according to claim 2, wherein the number of $SiO_2$ in the chemical formula is 30 to 80.

18. An aqueous composition according to claim 3, wherein the number of $P_2O_5$ in the chemical formula is 5.6 to 6.6.

19. An aqueous composition according to claim 8, wherein the colloidal silica comprises spherical silica particles of a size between 5 and 60 nm.

20. An aqueous composition according to claim 9, wherein the ratio of the sum of the specific surface area of the particles of the colloidal silica to the total molar number of all metal oxides is 1:20000 to 1:150000.

* * * * *